(12) United States Patent
Kimes et al.

(10) Patent No.: US 9,541,143 B2
(45) Date of Patent: Jan. 10, 2017

(54) MAGNETIC SYSTEM FOR CONTROLLING AN OPERATING MODE OF AN OVERRUNNING COUPLING ASSEMBLY AND OVERRUNNING COUPLING AND MAGNETIC CONTROL ASSEMBLY INCLUDING THE SYSTEM

(71) Applicant: Means Industries, Inc., Saginaw, MI (US)

(72) Inventors: John W. Kimes, Wayne, MI (US); Jeffrey L. Viola, Berkley, MI (US)

(73) Assignee: Means Industries, Inc., Saginaw, MI (US)

(*) Notice: Subject to any disclaimer, the term of this patent is extended or adjusted under 35 U.S.C. 154(b) by 85 days.

(21) Appl. No.: 14/592,233

(22) Filed: Jan. 8, 2015

(65) Prior Publication Data
US 2015/0211587 A1    Jul. 30, 2015

Related U.S. Application Data

(60) Provisional application No. 61/931,774, filed on Jan. 27, 2014.

(51) Int. Cl.
*F16D 41/16* (2006.01)
*F16D 48/06* (2006.01)
*F16D 41/12* (2006.01)

(52) U.S. Cl.
CPC .......... *F16D 41/16* (2013.01); *F16D 48/064* (2013.01); *F16D 41/125* (2013.01); *F16D 2300/18* (2013.01); *F16D 2500/1022* (2013.01); *F16D 2500/3023* (2013.01); *F16D 2500/3026* (2013.01); *F16D 2500/5012* (2013.01); *F16D 2500/7041* (2013.01)

(58) Field of Classification Search
CPC ...... F16D 25/14; F16D 41/16; F16D 2300/18; F16D 41/125
See application file for complete search history.

(56) References Cited

U.S. PATENT DOCUMENTS

| 2,947,537 A | 8/1960 | Littell et al. |
| 2,959,062 A | 11/1960 | Looker |
| 4,050,560 A | 9/1977 | Torstenfelt |

(Continued)

*Primary Examiner* — Jacob S Scott
*Assistant Examiner* — Lori Wu
(74) *Attorney, Agent, or Firm* — Brooks Kushman P.C.

(57) ABSTRACT

A magnetic system for controlling the operating mode of an overrunning coupling assembly and an overrunning coupling and magnetic control assembly including the system are provided. The system includes a control member mounted for controlled shifting movement and a translator structure supported for travelling along a path between first and second end positions. The structure is coupled to the control member for selective, small displacement, control member movement upon experiencing a net translational force. The translator structure supports a pair of spaced apart magnetic or ferromagnetic targets for movement therewith. A magnetic field sensor is disposed adjacent and stationary with respect to the translator structure between the first and second end positions of travel for sensing magnetic flux to produce an output signal which is based on position of the translator structure. A variable magnetic field is generated in response to travel of the translator structure.

18 Claims, 7 Drawing Sheets

(56) References Cited

U.S. PATENT DOCUMENTS

| | | |
|---|---|---|
| 4,651,847 A | 3/1987 | Hermanns |
| 5,927,455 A | 7/1999 | Baker et al. |
| 6,193,038 B1 | 2/2001 | Scott et al. |
| 6,244,965 B1 | 6/2001 | Klecker et al. |
| 6,290,044 B1 | 9/2001 | Burgman et al. |
| 6,607,292 B2 | 8/2003 | Gutierrez et al. |
| 6,905,009 B2 | 6/2005 | Reed et al. |
| 7,198,587 B2 | 4/2007 | Samie et al. |
| 7,258,214 B2 | 8/2007 | Pawley et al. |
| 7,275,628 B2 | 10/2007 | Pawley et al. |
| 7,464,801 B2 | 12/2008 | Wittkopp |
| 7,491,151 B2 | 2/2009 | Maguire et al. |
| 7,743,678 B2 | 6/2010 | Wittkopp et al. |
| 7,992,695 B2 | 8/2011 | Wittkopp et al. |
| 8,051,959 B2 | 11/2011 | Eisengruber |
| 8,061,496 B2 | 11/2011 | Samie et al. |
| 8,079,453 B2 | 12/2011 | Kimes |
| 8,286,772 B2 | 10/2012 | Eisengruber |
| 8,324,890 B2 | 12/2012 | Lin |
| 2004/0238306 A1 | 12/2004 | Reed et al. |
| 2006/0185957 A1 | 8/2006 | Kimes et al. |
| 2006/0278486 A1* | 12/2006 | Pawley ................... F16D 41/12 192/43.1 |
| 2007/0034470 A1 | 2/2007 | Fetting, Jr. et al. |
| 2007/0216402 A1* | 9/2007 | Blessing ................. F16H 59/70 324/207.24 |
| 2007/0278061 A1 | 12/2007 | Wittkopp et al. |
| 2008/0045371 A1* | 2/2008 | Donofrio ................ F16H 48/08 475/230 |
| 2008/0110715 A1 | 5/2008 | Pawley |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2010/0252384 A1 | 10/2010 | Eisengruber |
| 2011/0183806 A1 | 7/2011 | Wittkopp et al. |
| 2011/0192697 A1 | 8/2011 | Prout et al. |
| 2012/0107145 A1* | 5/2012 | Roby ....................... F01P 5/04 417/223 |
| 2012/0145506 A1 | 6/2012 | Samie et al. |
| 2012/0152683 A1 | 6/2012 | Kimes |
| 2012/0152687 A1 | 6/2012 | Kimes et al. |
| 2013/0228405 A1* | 9/2013 | Tsai ......................... B62L 3/02 188/344 |

* cited by examiner

MAGNETIC SYSTEM FOR CONTROLLING AN OPERATING MODE OF AN OVERRUNNING COUPLING ASSEMBLY AND OVERRUNNING COUPLING AND MAGNETIC CONTROL ASSEMBLY INCLUDING THE SYSTEM

CROSS-REFERENCE TO RELATED APPLICATIONS

This application claims the benefit of provisional patent application Ser. No. 61/931,774 filed Jan. 27, 2014. This application is related to U.S. patent application Ser. No. 14/150,090 filed Jan. 8, 2014.

TECHNICAL FIELD

This invention relates, in general, to the field of overrunning coupling and control assemblies and, more particularly, to closed-loop systems for controlling the operating mode of overrunning coupling assemblies.

Overview

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

roller type which includes spring-loaded rollers between inner and outer races of the one-way clutch. (Roller type is also used without springs on some applications); and sprag type which includes asymmetrically shaped wedges located between inner and outer races of the one-way clutch.

One way clutches typically over run during engine braking rather than enable engine braking. It is for this reason there is a friction pack at the same transmission node. Selectable dynamic clutches can be used to prevent the over running condition and enable engine braking.

Controllable or selectable one-way clutches (i.e., OWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes. The selection mechanism is a separate system or assembly that is fixed relative to the OWC by same fastening technique. Such selection mechanism is fixed in a separate and subsequent operation after the OWC has been formed. That subsequent operation requires an additional work station, be it automated or otherwise, which increases, in particular, the manufacturing time and cost of the finished assembly.

In addition, the fact that separate, external parts may be mounted on or near the OWC in a source of quality defects and thus adds to the cost of making such controllable or selectable OWC's which may be significant on a mass production basis. Also, due to dimensional stack-up issues control element or selector plate binding can result especially over long term use.

Driven by a growing demand by industry, governmental regulatory agencies and consumers for durable and inexpensive products that are functionally comparable or superior to prior art products, a continuing need exists for improvements in clutches subjected to difficult service conditions such as extreme temperatures. This is particularly true in the automotive industry where developers and manufacturers of clutches for automotive applications must meet a number of competing performance specifications for such articles.

Another problem associated with prior art coupling and control assemblies is that it is undesirable to have a relatively large distance between the control element and the activator which moves the control element. A large distance reduces the amount of available space in which the assembly is located. For example, in a vehicle, the amount of space for such assemblies is typically quite limited.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include 2012/0145506; 2011/0192697; 2011/0183806; 2010/0252384; 2009/0194381; 2008/0223681; 2008/0169166; 2008/0185253; and the following U.S. Pat. Nos. 8,079,453; 7,992,695, 8,051,959, 7,743,678; and 7,491,151.

U.S. Pat. No. 8,272,488 discloses in its FIGS. 9a-9c (labeled as FIGS. 1a-1c, respectively, in this Application), a "perpendicular actuating shift valve" latching mechanism, generally indicated at 500. A control plate or element 502 of a one-way clutch is provided which shifts or slides along a shift direction between pocket and recess plates (not shown) of the clutch to controllably cover and uncover struts 504 which are spring-biased within the pocket plate. A free end portion 506 of an actuating arm or pin, generally indicated at 508, may move within a curved pin recess or groove 510 formed in an outer surface 528 of a valve or piston, generally indicated at 512, in a direction substantially perpendicular to a shift direction of the control plate 502 during sliding movement of the piston or valve 512 within a bore 513 formed in a housing 514. The side walls or surfaces of the grooves 510 lock the pin 508 therebetween as shown in FIG. 1a to prevent movement of the pin 508 in a direction parallel to the shift direction of the control plate 502. The groove 510 may be curved and the free end portion 506 of the actuating arm 508 may simultaneously move within the groove 510 in both a direction substantially parallel to the shift axis and in a direction substantially perpendicular to the shift axis during movement of the piston 512 within the housing 514. Compression springs 516, also disposed within the bore 513, are biased between a cover 518 of the housing 514 and one end 520 of the valve 512. The plate 502 of the one-way clutch is disclosed in its overrun position in FIG. 1a and moves to its locked position in FIG. 1c. Application of a control pressure 522 through a control portion 523 of the housing 514 at the opposite end 524 of the valve or piston 512 causes the valve 512 to move against the biasing action of the compression springs 516 so that the actuating pin 508, which is secured to the control plate 502 at a pin attachment portion 526, moves within the curved pin recess or groove 510 formed in the outer surface 528 of the valve 512 as shown in FIGS. 1b and 1c. As shown in FIG. 1c, one of the struts 504 now extends through an aperture 530 formed in the control plate 502 to lock the one-way clutch.

Other U.S. patent publications which disclose controllable or selectable one-way clutches include U.S. Pat. Nos. 6,193,038; 7,198,587; 7,275,628; and 7,464,801, and U.S. Publication Application Nos. 2007/0278061; 2008/0110715; 2009/0159391; and 2009/0211863.

Other U.S. patent documents related to the present application include: U.S. Pat. Nos. 2,947,537; 2,959,062; 4,050,560; 4,651,847; 6,607,292; 6,905,009; 8,061,496; 8,286,772; 2004/0238306; 2006/0185957; 2007/0034470; 2012/0152683; and 2012/0152687.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMR) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing elements) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field Modern automotive vehicles employ an engine transmission system having gears of different sizes to transfer power produced by the vehicle's engine to the vehicle's wheels based on the speed at which the vehicle is traveling. The engine transmission system typically includes a clutch mechanism which may engage and disengage these gears. The clutch mechanism may be operated manually by the vehicle's driver, or automatically by the vehicle itself based on the speed at which the driver wishes to operate the vehicle.

In automatic transmission vehicles, a need arises for the vehicle to sense the position of the clutch for smooth, effective shifts between gears in the transmission and for overall effective transmission control. Therefore, a clutch-position sensing component for sensing the linear position of the clutch may be used by automatic transmission vehicles to facilitate gear shifting and transmission control.

Current clutch-position sensing components utilize magnetic sensors. One advantage to using magnetic sensors is that the sensor need not be in physical contact with the object being sensed, thereby avoiding mechanical wear between the sensor and the object. However, actual linear clutch measurement accuracy may be compromised when the sensor is not in physical contact with the sensed object because of a necessary gap or tolerance that exists between the sensor and the object. Moreover, current sensing systems addressing this problem use coils and certain application-specific integrated circuits which are relatively expensive U.S. Pat. No. 8,324,890 discloses a transmission clutch position sensor which includes two Hall sensors located at opposite ends of a flux concentrator outside the casing of the transmission to sense a magnetic field generated by a magnet attached to the clutch piston. To reduce sensitivity to magnet-to-sensor gap tolerances, a ratio of the voltage of one Hall sensor to the sum of the voltages from both Hall sensors is used to correlate to the piston and, hence, clutch position.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

SUMMARY OF EXAMPLE EMBODIMENTS

An object of at least one embodiment of the present invention is to provide a magnetic system for controlling an operating mode of an overrunning coupling assembly by precisely controlling the position of a control member which controls the operating mode through the use of position feedback.

Another object of at least one embodiment of the present invention is to provide a magnetic system for controlling an operating mode of an overrunning coupling assembly where a control member which controls the operating mode has enhanced position repeatability through the use of position feedback.

In carrying out the above objects and other objects of at least one embodiment of the present invention, a magnetic system for controlling the operating mode of an overrunning coupling assembly including first and second coupling members having first and second coupling faces, respectively, in close-spaced opposition with one another is provided. At least one of the members is mounted for rotation about a rotary axis. The system includes a control member mounted for controlled shifting movement between the coupling faces and a magnetic translator structure supported for travelling along a path between first and second end positions which correspond to first and second operating modes of the coupling assembly, respectively. The structure is coupled to the control member for selective, small displacement, control member movement upon experiencing a net translational force. The translator structure supports a pair of spaced apart magnetic or ferromagnetic targets for movement therewith. A magnetic field sensor is disposed adjacent and stationary with respect to the translator structure between the first and second end positions of travel for sensing magnetic flux to produce an output signal which is based on position of the translator structure. A variable magnetic field is generated to in response to travel of the translator structure along the path between the first and second end positions.

The sensor may include a magnetic field sensing element.

The sensor may be back-biased wherein the targets are ferromagnetic targets.

The translator structure may include a magnetic piston which supports magnetic targets. The system may further include a housing having a bore in which the piston is slidably supported. The piston reciprocates within the bore in response to the net translational force. The sensor may be disposed within an aperture in communication with the bore in the housing. The sensor senses a portion of the magnetic flux from the magnetic piston and passing into the aperture.

The magnetic targets may include a pair of spaced apart magnetic sources imbedded in an outer wall of the piston. The magnetic sources may be made of permanent magnet materials.

The traveling magnetic piston may generate a predetermined magnetic flux density versus piston displacement characteristic in the aperture.

The output signal may be a push-pull output signal.

The magnetic sources may be rare-earth magnets having opposite polarity.

The coupling assembly may be a clutch assembly, the coupling members may be clutch members and the coupling faces may be clutch faces.

Further in carrying out the above objects and other objects of at least one embodiment of the present invention, an overrunning coupling and magnetic control assembly is provided. The assembly includes a coupling subassembly including first and second coupling members having first and second coupling faces, respectively, in close-spaced opposition with one another. At least one of the members is mounted for rotation about a rotary axis. A control member is mounted for controlled shifting movement between the coupling faces. A translator structure is supported for travelling along a path between first and second end positions which correspond to first and second operating modes of the coupling subassembly, respectively. The structure is coupled to the control member for selective small displacement control member movement upon experiencing a net translational force. The translator structure supports a pair of spaced apart magnetic or ferromagnetic targets for movement therewith. A magnetic field sensor is disposed adjacent and stationary with respect to the translator structure between the first and second end positions of travel for sensing magnetic flux to produce an output signal which is based on the position of the translator structure. A variable magnetic field is generated in response to travel of the translator structure along the path between the first and second end positions.

The sensor may include a magnetic field sensing element.

The sensor may be back-biased wherein the targets are ferromagnetic. The translator structure may include a magnetic piston supporting magnetic targets. The assembly may further include a housing having a bore in which the magnetic piston is slidably supported. The piston reciprocates within the bore in response to the net translational force.

The sensor may be disposed within an aperture in communication with the bore in the housing. The sensor senses a portion of the magnetic flux from the magnetic piston which passes into the aperture.

The magnetic targets may include a pair of spaced apart magnetic sources imbedded in an outer wall of the piston.

The magnetic sources may be made of permanent magnet materials.

The traveling magnetic piston may generate a predetermined magnetic flux density versus piston displacement characteristic in the aperture.

The output signal may be a push-pull output signal.

The magnetic sources may be rare-earth magnets having opposite polarity.

The coupling members may be clutch members and the coupling faces may be clutch faces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
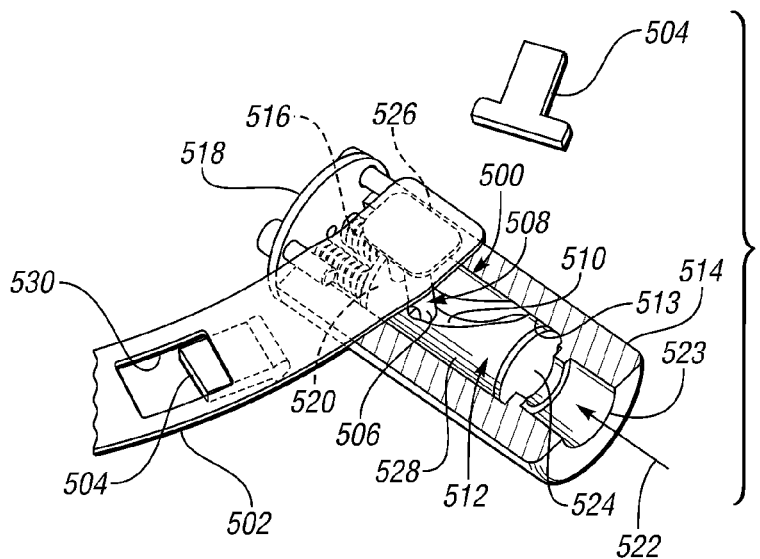
FIGS. 1a-1c are schematic views, partially broken away and in cross section, of a control member or element with associated struts and its control apparatus of the prior art in the form of a perpendicular actuating shift valve or piston (latching mechanism) in different control positions in the different views.
Figure 1B:
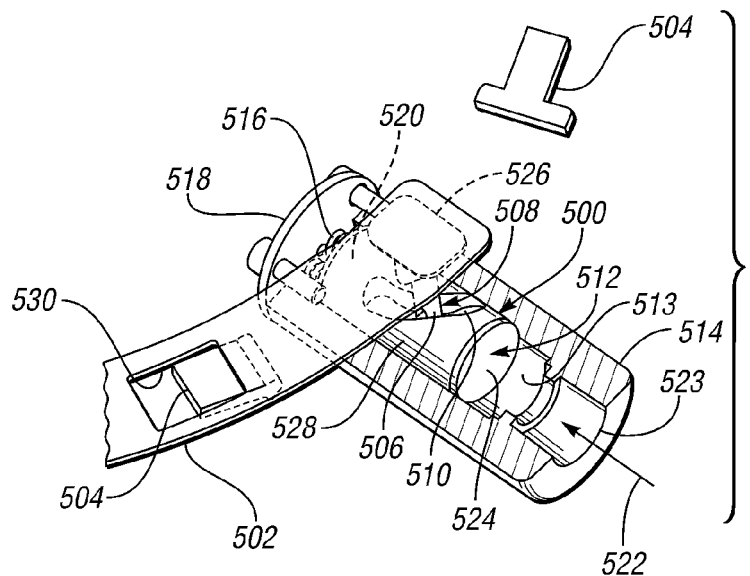
Figure 1C:
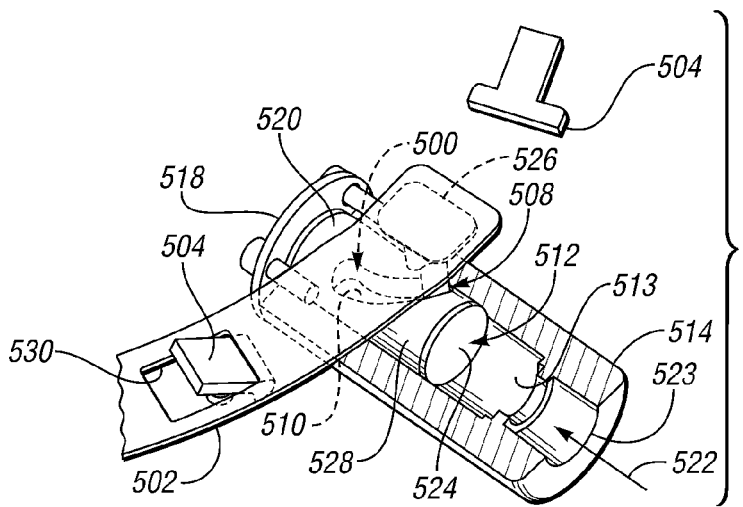
Figure 2:
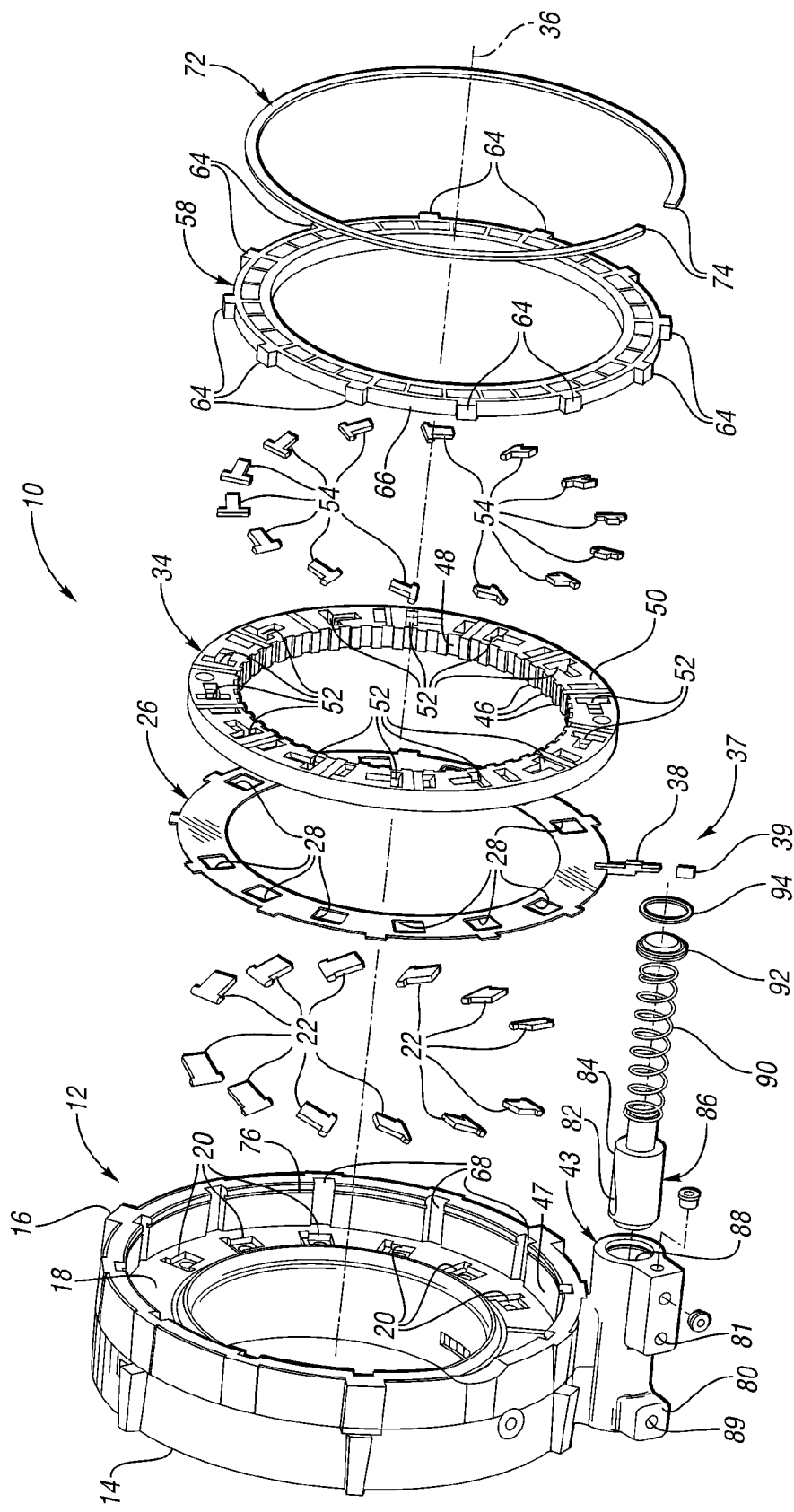
FIG. 2 is an exploded perspective view of an overrunning coupling or clutch and control assembly (without feedback) constructed in accordance with at least one embodiment of the present invention.

Referring again to the drawing figures, FIG. 2 is an exploded perspective view of an overrunning clutch or coupling and control assembly, generally indicated at 10, and constructed in accordance with at least one embodiment of the present invention. As described in U.S. Pat. No. 8,602,187, and pending U.S. patent application Ser. No. 14/150,090 filed Jan. 8, 2014, both assigned to the assignee of the present application, the assembly 10 includes an annular reverse pocket plate or first outer coupling member, generally indicated at 12. An outer axially-extending surface 14 of the plate 12 has external splines 16 for coupling the plate 12 to the inner surface of a transmission case (not shown). An inner radially extending surface or coupling face 18 of the plate 12 is formed with spaced pockets 20 in which reverse struts 22 are pivotally biased outwardly by coil springs (not shown) disposed in the pockets 20 under their respective struts 22. Preferably, twelve reverse struts 22 are provided. However, it is to be understood that a greater or lesser number of reverse struts 22 may be provided.

The assembly 10 also includes a control member or element in the form of a selector slide plate, generally indicated at 26, having a plurality of spaced apertures 28 extending completely therethrough to allow the reverse struts 22 to pivot in their pockets 20 and extend through the apertures 28 to engage spaced locking formations or ramped reverse notches (not shown) formed in a radially extending surface or coupling face of a forward or inner pocket plate or coupling member, generally indicated at 34, when the plate 26 is properly angularly positioned about a common central rotational axis 36 by an actuator arm, generally indicated at 37. The arm 37 includes a shift fork part 38 coupled to the plate 26 and a slide part 39 slidably connected to a translator structure or piston, generally indicated at 86, within a housing, generally indicated at 43.

Figure 3:
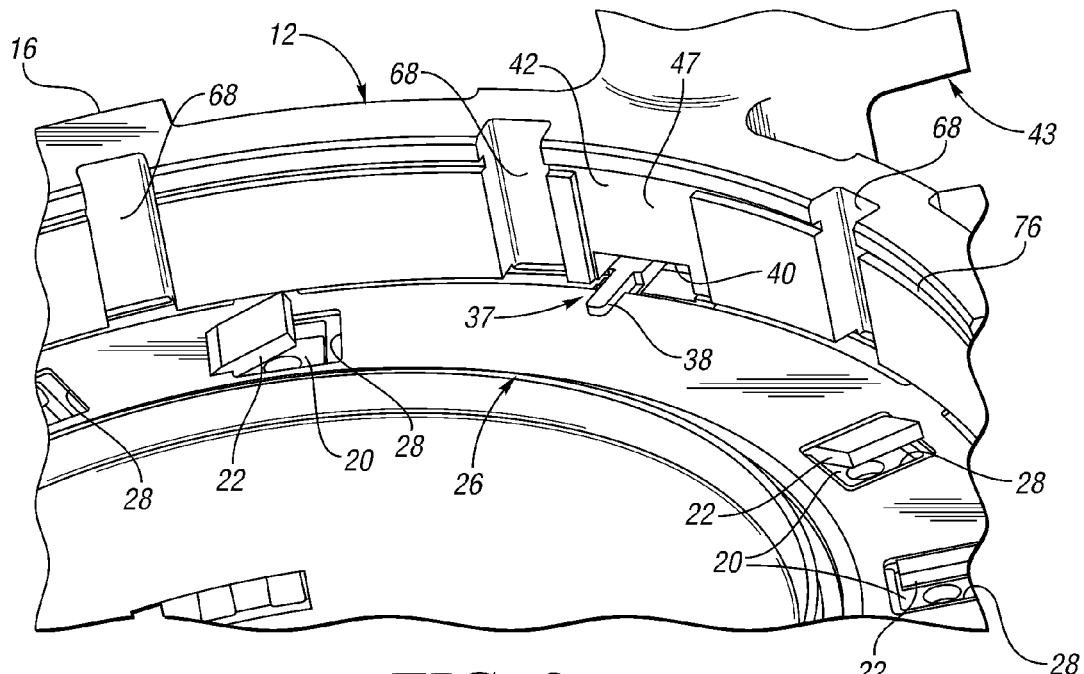
FIG. 3 is a perspective schematic view, partially broken away, of a control element (selector plate) coupled to an actuator arm which has rotated or shifted the control element to expose reverse struts.
Figure 4:
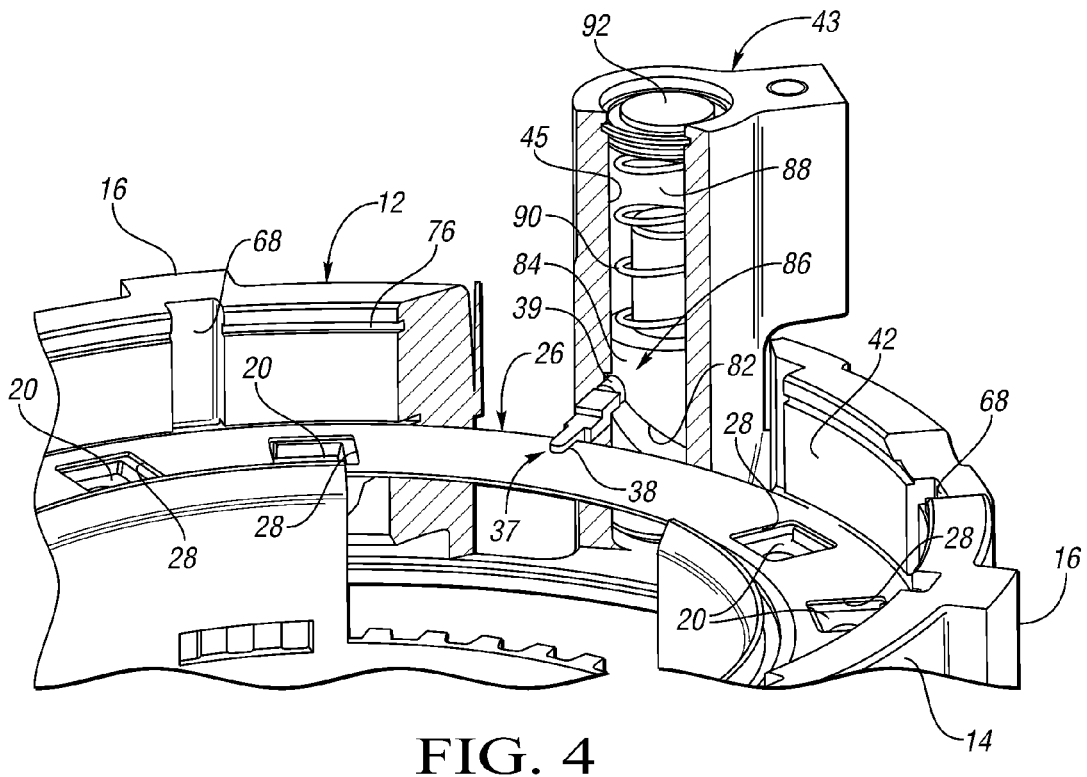
FIG. 4 is a perspective schematic view, similar to the view of FIG. 3, with a portion of the common wall separating and shared by the first coupling member and the housing removed to show an actuator piston or valve and the actuator arm in the housing and with the reverse struts removed.
Figure 5:
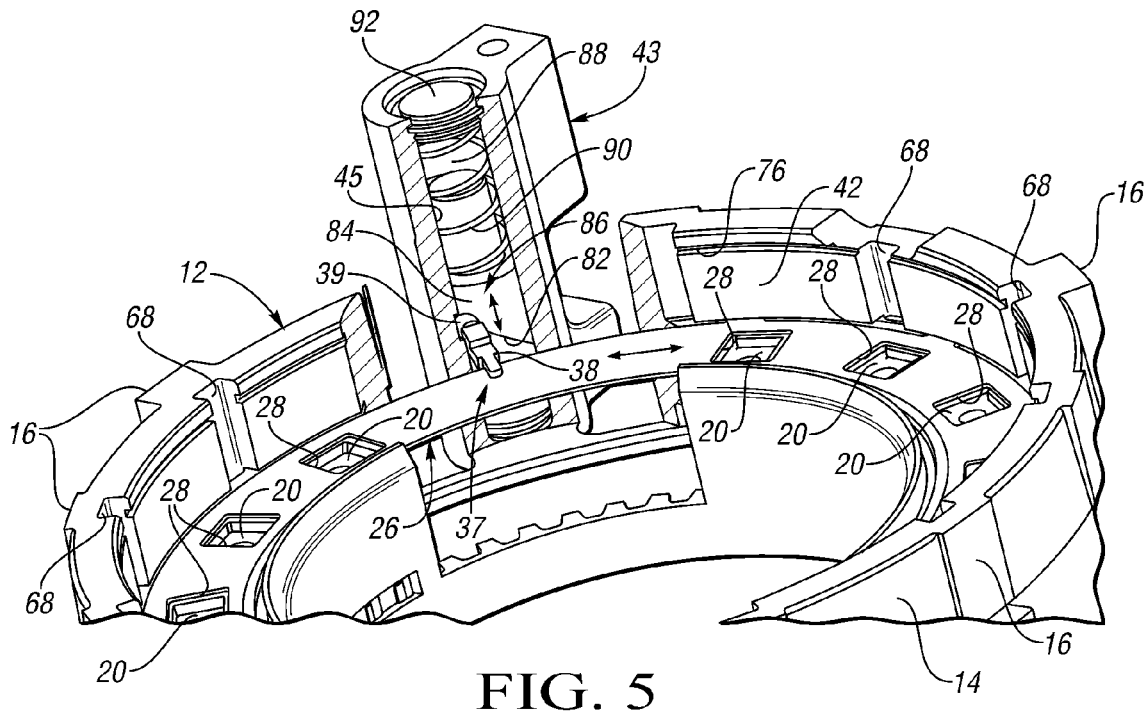
FIG. 5 is a perspective schematic view, similar to the view of FIG. 4, with the portion of the common wall removed to show the angular slot in the actuator piston wherein axial movement of the piston creates radial movement of the selector plate.

As shown in FIG. 3, the arm 37 extends through a notch or elongated slot 40 formed through a wall or wall portion 42 of an outer circumferential end wall of the plate 12. The wall 42 is a common wall separating and shared by the first coupling member 12 and the housing 43. The elongated slot 40 extends between and thereby communicates an inner surface 45 of the housing 43 and an inner surface 47 of the wall 42 of the first coupling member 12. The fork part 38 of the arm 37 is secured or coupled to the control plate 26. The slide part 39 of the arm 37 moves in the slot 40 between different use positions to cause the plate 26 to slide or shift between its control positions to alternately cover or uncover the struts 22 (i.e., to engage or disengage the reverse struts 22, respectively).

The plate 34 comprises a splined ring having internal splines 46 formed at its inner axially extending surface 48. A radially extending surface 50 or coupling face spaced from the other coupling face (not shown) of the plate 34 has a plurality of spaced pockets 52 formed therein to receive a plurality of forward struts 54 therein which are pivotally biased by corresponding coil springs (not shown). Preferably, fourteen forward struts 54 are provided. However, it is to be understood that a greater or lesser number of forward struts 54 may be provided.

The assembly 10 may also include a second outer coupling member or notch plate, generally indicated at 58, which has a plurality of locking formations, cams or notches (not shown) formed in a radially extending surface or coupling face (not shown) thereof by which the forward struts 54 lock the forward plate 34 to the notch plate 58 in one direction about the axis 36 but allow free-wheeling in the opposite direction about the axis 36. The notch plate 58 includes external splines 64 which are formed on an outer axial surface 66 of the plate 58 and which are received and retained within axially extending recesses 68 formed within the inner axially extending surface 47 of the outer circumferential end wall of the plate 12.

The assembly 10 may further include a snap ring, generally indicated at 72, having end portions 74 and which fits within an annular groove 76 formed within the inner surface 47 of the end wall of the plate 12 to hold the plates 12, 26, 34 and 58 together and limit axial movement of the plates relative to one another.

FIG. 3 is a view of the assembly 10 with the shift fork 38 of the arm 37 in one control position of its control positions to disengage the reverse struts 22. The shift fork 38 is rotated about 7° in a forward overrun direction about the axis 36 to rotate the selector plate 26 to, in turn, allow the reverse struts 22 to move from their disengaged position in their pockets 20 to their engaged position with the notches (not shown) of the plate 34.

Referring to FIGS. 2-6, the housing 43 has an outer surface 80 and the inner surface 45 which defines a bore 88 within the housing 43. A control port 89 (FIG. 2) extends between and fluidly communicates the inner and outer surfaces 45 and 80, respectively, of the housing 43 to transmit a control pressure signal into the housing 43. A second control port 81 (FIG. 2) is also provided for oil flow. The first coupling member 12 and the housing 43 are formed as a unitary component having the common wall 42 separating and shared by the first coupling member 12 and the housing 43. The member 12 and the housing 43 is typically formed as a one-piece aluminum casting thereby providing an integral unitary structure.

The free end portion or slide part 39 of the actuating arm 37, moves within a curved or angular pin recess or groove 82 formed in an outer surface 84 of the valve or piston (i.e., translator structure) 86 in a direction substantially perpendicular to a shift direction of the control plate 26 during sliding movement of the piston 86 within the bore 88 formed in the housing 43. The side walls or surfaces of the groove 82 lock the slide part 39 therebetween to prevent movement of the slide part 39 in a direction parallel to the shift direction of the control plate 26. The groove 82 may be curved and the slide part 39 of the actuating arm 37 may simultaneously move within the groove 82 in both a direction substantially parallel to the shift axis and in a direction substantially perpendicular to the shift axis during movement of the piston 86 within the housing 43. A compression spring 90, also disposed within the bore 88, is biased between a cover 92 of the housing 43 and a shoulder of the valve 86. The cover 92 is held in the housing 43 by a locking or snap ring 94 (FIGS. 2 and 6).

Application of a control pressure through the control port 89 of the housing 43 at the end of the valve or piston 86 opposite the spring 90 causes the valve 86 to move against the biasing action of the compression spring 90 so that the slide part 39 of the actuating arm 37, which is secured to the control plate 26 at the fork 38, moves within the curved pin recess or groove 82 formed in the outer surface 84 of the valve 86.

Figure 6:
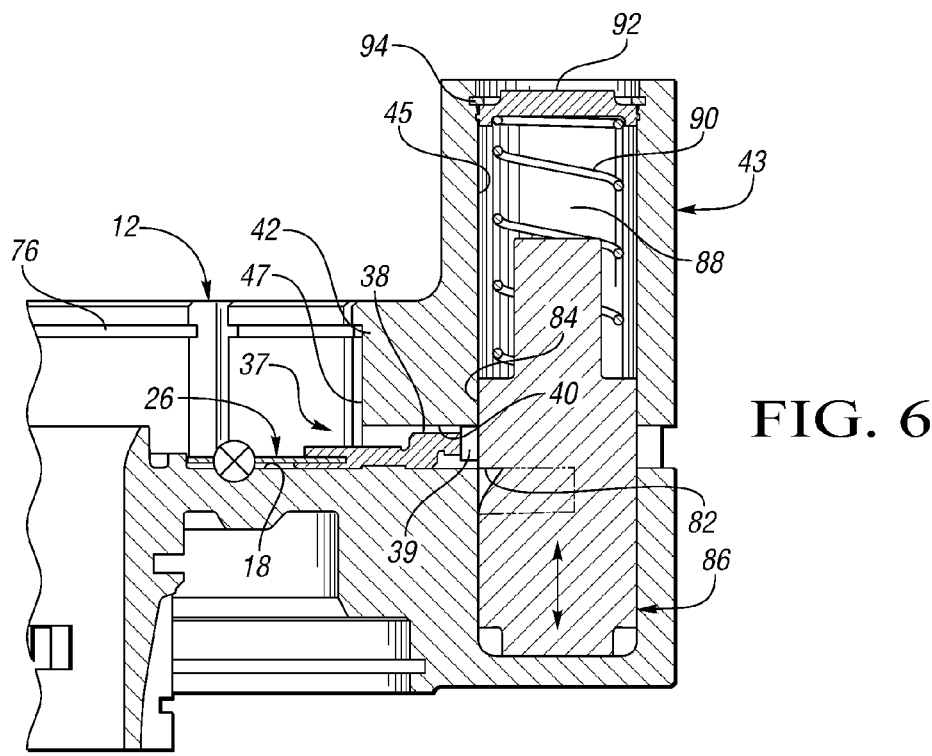
FIG. 6 is a view, partially broken away and in cross section, showing the integrally formed common wall and how the selector plate is actuated by movement of the piston within the housing.
Figure 7:
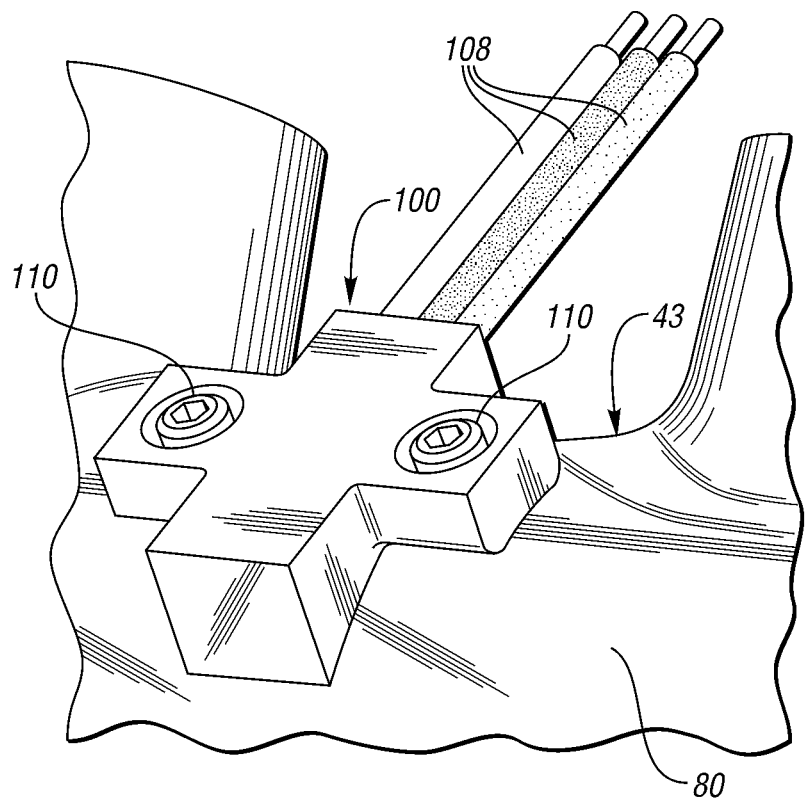
FIG. 7 is an enlarged perspective view of one embodiment of a magnetic field sensor or device for use in the assembly of FIG. 2.
Figure 8:
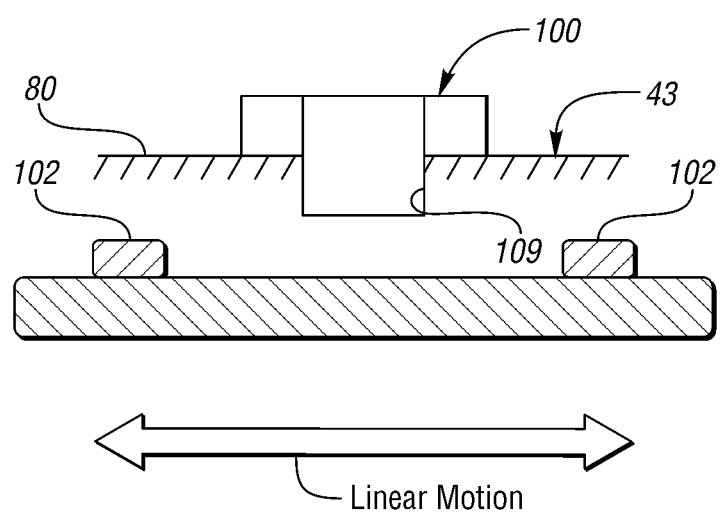
FIG. 8 is a diagrammatic view, partially broken away and in cross section, of the device or sensor head mounted in a part of a non-ferrous housing to sense a variable magnetic field generated by a pair of spaced apart magnetic or ferromagnetic targets supported on a non-ferrous object which moves linearly relative to the housing to illustrate one of the features of the present invention.
Figure 9:
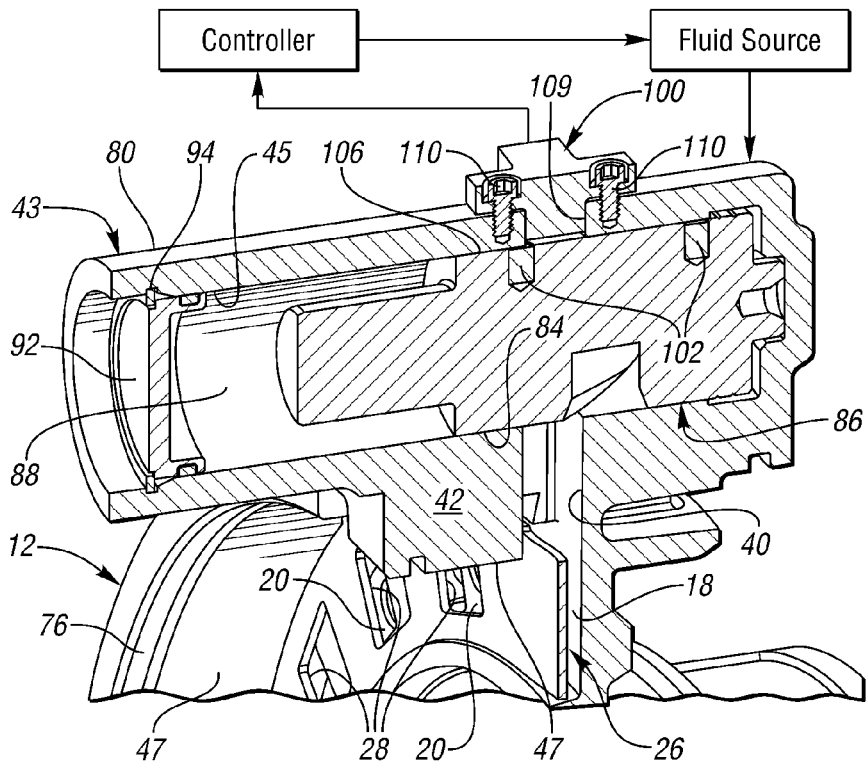
FIG. 9 is a perspective view, partially broken away and in cross section, of one embodiment of a magnetic system including a piston for controlling the operating mode of the overrunning coupling or clutch assembly of FIG. 2.

When the actuator piston 86 is in its "home" position as shown in FIG. 6, the reverse struts 22 are covered by the selector plate 26. A control pressure signal in the form of pressurized oil is applied and the piston 86 is moved "up" in the bore 88 upon experiencing a net translational force. This axial movement of the actuator piston 86 is translated to radial movement of the selector plate 26 via the arm 37 and the angular slot 82 in the actuator piston 86, hence uncovering the reverse struts 22.

FIGS. 7, 8, 9 and 10 show a magnetic field sensor device, generally indicated at 100. The device 100 may be a Hall-effect sensor which measures linear displacement of the translator structure (which may be characterized as a magnetic piston 86) which supports a pair of appropriately spaced and sized rare-earth, automotive grade magnets 102 which are preferably embedded in holes 104 formed in the outer circumferential surface or wall 106 of the piston 86. The body 280 of the piston 86 is preferably non-ferrous such as aluminum. The magnets 102 are oriented in a plane with opposite polarity magnetization substantially perpendicular to the plane. Alternatively, the piston 86 may be characterized as a ferromagnetic piston which supports a pair of appropriately sized and spaced ferromagnetic targets or structures within the holes 104.

The device 100 typically has three wires 108 (input, output and ground) and provides an industry standard, push-pull voltage output. The device 100 performs a Y-axis reading since it is oriented radially. The device 100 is mounted in a port 109 formed through an outer wall of the housing 43 and is held in place by fasteners such as mounting screws 110 so that a lower surface of the device 100 is in close proximity to the inner surface 45 of the bore 88.

Figure 10:
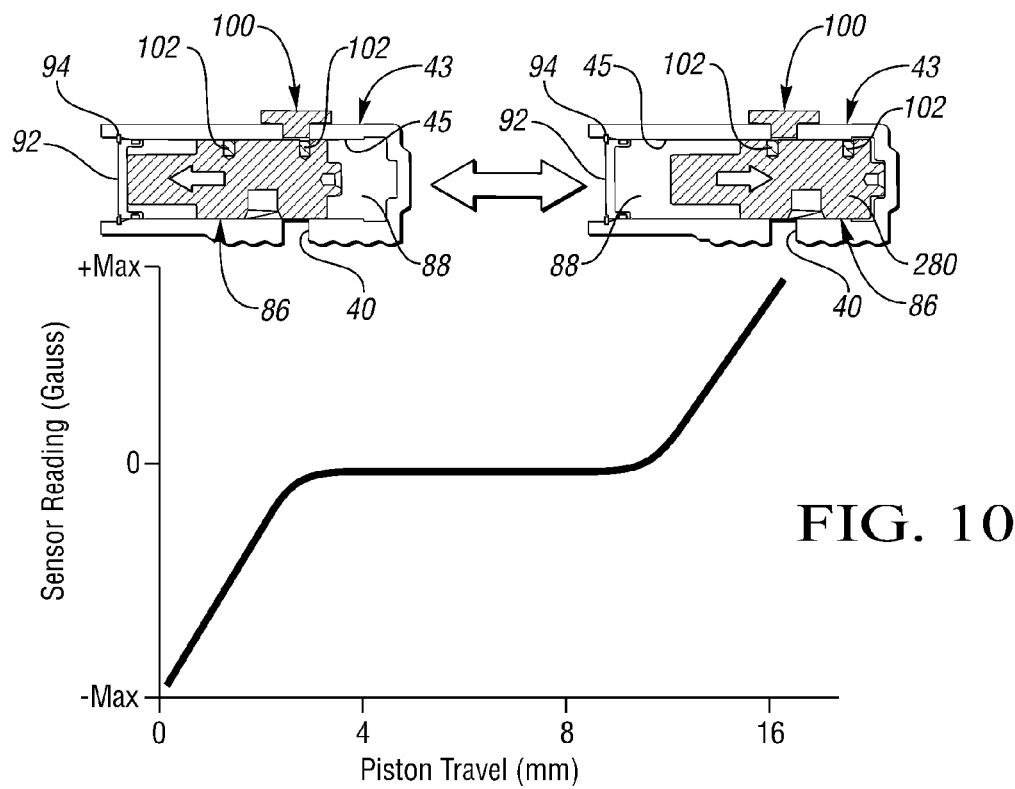
FIG. 10 is a graph of magnetic flux density versus piston stroke for travel between two end positions of the piston of FIG. 9 as illustrated by two views at the top of the graph.

The device 100 accurately detects the position of the piston 86 at each end portion of piston travel (i.e., stroke) with a single output (i.e., voltage output). Approximately 2.0 to 3.0 mm of piston travel can be discerned or determined near each end of piston travel substantially independent of the total length of piston travel as shown in the graph of FIG. 10. FIG. 10 shows a predetermined magnetic flux density versus piston stroke characteristic at the interface between piston 86 and the housing 43. Preferably, polarity of the magnets 102 is opposite each other for sensor differentiation.

Figure 11:
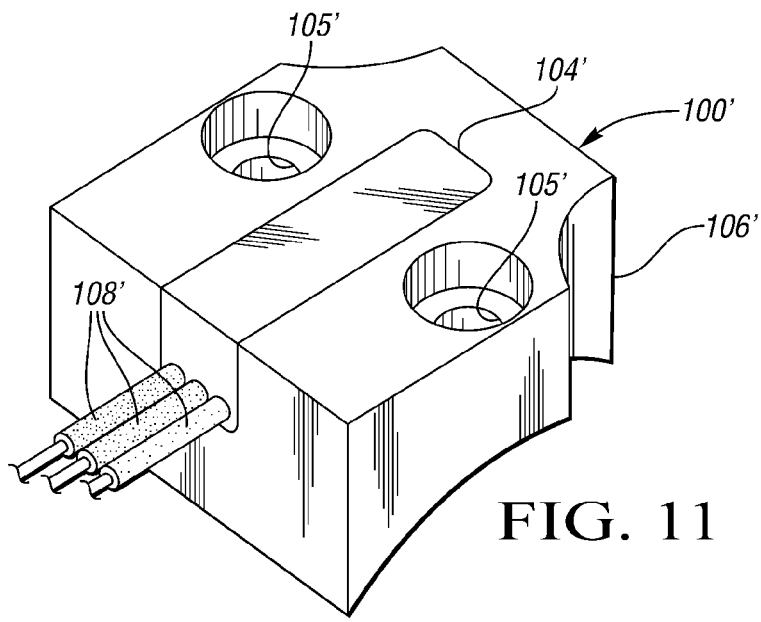
FIG. 11 is a top perspective view of another embodiment of a magnetic field sensor or device having a plug feature to seal the assembly of FIG. 2.
Figure 12:
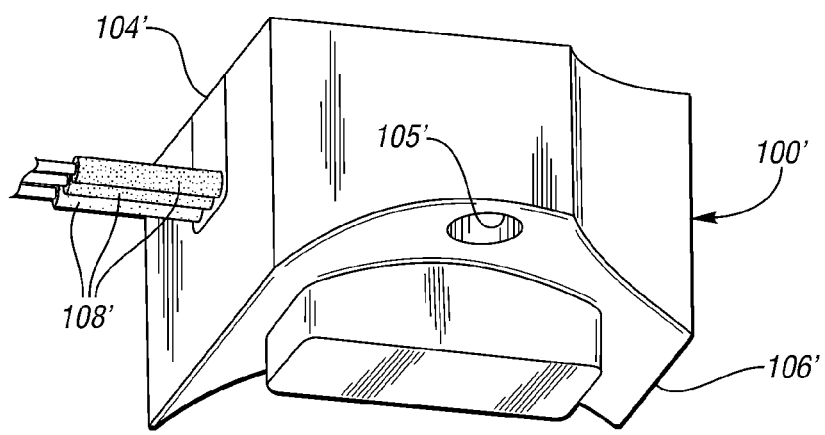
FIG. 12 is a bottom perspective view of the sensor of FIG. 11.
Figure 13:
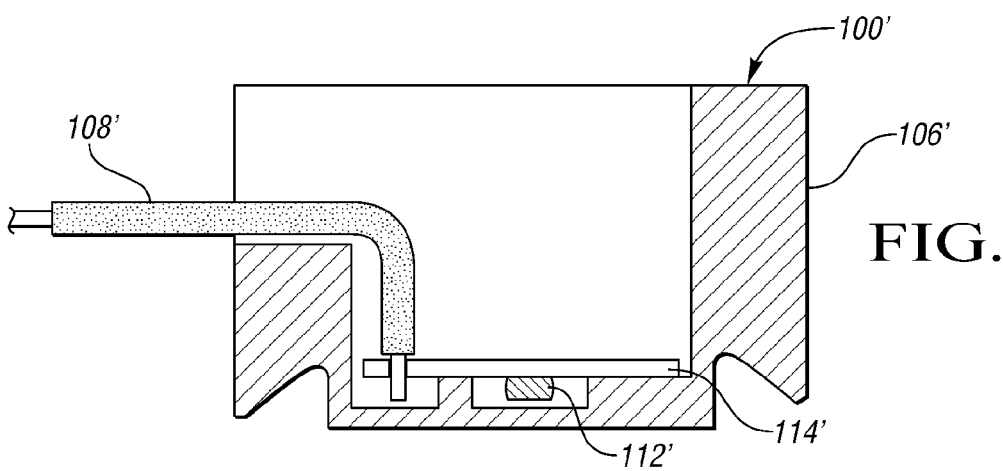
FIG. 13 is an enlarged sectional view of the sensor of FIGS. 11 and 12.

FIGS. 11-13 disclose another embodiment of a magnetic field sensor, generally indicated at 100'. The sensor 100' includes a first part 104' embedded in a plug part 106' which seals the aperture 109 in the housing 43. The plug part 106' has holes 105' formed therethrough to fasten the device 100' at the outer surface 80 of the housing 43.

The sensor 100' typically includes a linear Hall sensor or sensing element 112' mounted on a circuit board 114' on which other electronics or components are mounted as is well-known in the art. For example, the sensor 100' may comprise a linear Hall Effect device available from Allegro Microsystems.

Instead of magnets embedded in the outer wall of the piston 86, ferromagnetic parts or pieces may be embedded in the outer wall of the piston 86. In this case, the device 100 or 100' may be a back-biased device wherein the device includes a rare earth pellet or magnet whose magnetic field varies as the piston 86 travels along its stroke or path. The variable magnetic field is sensed by a magnetic sensing element of the device 100 or 100'. The device 100' has three wires 108', in the same manner the device 100 has wires 108.

The output signal from the device 100 or the device 100' is a feedback signal which is received by a controller (FIG. 9) such as a fluid controller which, in turn, provides a control signal to a fluid source such as a liquid fluid source which, in turn, provides the pressurized control fluid to the control port 89 in the housing 43. By providing feedback, the resulting closed-loop control system has improved sensitivity, accuracy and repeatability.

The resulting robust control system not only meets but exceeds the following criteria:
  Reports position within a distance of 3.0 mm or less (i.e., 2.0 mm) from each end stop;
  The sensor works within the worst-case mechanical tolerances of the casting, piston and sensor housing dimensions (+/−1.0 mm);
  The sensor works over a temperature range of −40 C to 150 C;
  Materials survive long exposure to ATF fluid;
  Uses small magnets to keep cost low (magnetic piston embodiment);
  Integrates into existing controllable mechanical diode (CMD) design through the machining access port.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A magnetic system for controlling first and second operating modes of an overrunning coupling assembly including first and second coupling members having opposed coupling faces, where at least one of the coupling members is mounted for rotation about a rotary axis, the system comprising:
  a control member mounted for controlled shifting movement between the coupling faces;
  a translator structure supported for travelling along a path between first and second end positions which correspond to the first and second operating modes of the overrunning coupling assembly, respectively, the structure being coupled to the control member for selective, shifting movement of the control member upon the structure experiencing a net translational force, wherein the translator structure comprises a magnetic piston supporting a pair of spaced apart magnetic or ferromagnetic targets for movement therewith and wherein the system further comprises a housing having a bore in which the piston is slidably supported, the piston reciprocating within the bore in response to the net translational force; and a magnetic field sensor disposed adjacent and stationary with respect to the translator structure between the first and second end positions of travel for sensing magnetic flux to produce an output signal which is based on the position of the translator structure wherein a variable magnetic field is generated in response to travel of the translator structure along the path between the first and second end positions.

2. The system as claimed in claim 1, wherein the sensor is back-biased and wherein the targets are ferromagnetic targets.

3. The system as claimed in claim 1, wherein the sensor is disposed within an aperture in communication with the bore in the housing, the sensor sensing a portion of the magnetic flux from the magnetic piston and passing into the aperture.

4. The system as claimed in claim 3, wherein the traveling magnetic piston generates a predetermined magnetic flux density versus piston displacement characteristic in the aperture.

5. The system as claimed in claim 1, wherein the magnetic targets comprise a pair of spaced apart magnetic sources imbedded in an outer wall of the piston.

6. The system as claimed in claim 5, wherein the magnetic sources are made of permanent magnet materials.

7. The system as claimed in claim 6, wherein the magnetic sources are rare-earth magnets having opposite polarity.

8. The system as claimed in claim 1, wherein the output signal is a push-pull output signal.

9. The system as claimed in claim 1, wherein the coupling assembly is a clutch assembly, the coupling members are clutch members and the coupling faces are clutch faces.

10. An overrunning coupling and magnetic control assembly comprising:
  a coupling subassembly including first and second coupling members having opposed coupling faces, where at least one of the coupling members is mounted for rotation about a rotary axis;
  a control member mounted for controlled shifting movement between the coupling faces;
  a translator structure supported for travelling along a path between first and second end positions which correspond to the first and second operating modes of the overrunning coupling assembly, respectively, the structure being coupled to the control member for selective, shifting movement of the control member upon the structure experiencing a net translational force, wherein the translator structure comprises a magnetic piston supporting a pair of spaced apart magnetic or ferromagnetic targets for movement therewith and wherein the system further comprises a housing having a bore in which the piston is slidably supported, the piston reciprocating within the bore in response to the net translational force; and
  a magnetic field sensor disposed adjacent and stationary with respect to the translator structure between the first and second end positions of travel for sensing magnetic flux to produce an output signal which is based on position of the translator structure wherein a variable magnetic field is generated in response to travel of the translator structure along the path between the first and second end positions.

11. The assembly as claimed in claim 10, wherein the sensor is back-biased and wherein the targets are ferromagnetic targets.

12. The assembly as claimed in claim 10, wherein the sensor is disposed within an aperture in communication with the bore in the housing, the sensor sensing a portion of the magnetic flux from the magnetic piston and passing into the aperture.

13. The assembly as claimed in claim 12, wherein the travelling magnetic piston generates a predetermined magnetic flux density versus piston displacement characteristic in the aperture.

14. The assembly as claimed in claim 10, wherein the magnetic targets comprise a pair of spaced apart magnetic sources imbedded in an outer wall of the piston.

15. The assembly as claimed in claim 14, wherein the magnetic sources are made of permanent magnet materials.

16. The assembly as claimed in claim 15, wherein the magnetic sources are rare-earth magnets having opposite polarity.

17. The assembly as claimed in claim 10, wherein the output signal is a push-pull output signal.

18. The assembly as claimed in claim 10, wherein the coupling members are clutch members and the coupling faces are clutch faces.

* * * * *